Patented Aug. 9, 1927.

1,638,100

UNITED STATES PATENT OFFICE.

ALBERT BARNES-THOMAS, OF DRESDEN, GERMANY, ASSIGNOR TO MARVLE PRODUCTS LIMITED, OF LONDON, ENGLAND, A BRITISH COMPANY.

IMITATION MARBLE, TILES, SLABS, AND SIMILAR MATERIAL ESPECIALLY FOR USE FOR DECORATIVE PURPOSES IN BUILDINGS AND OTHER PLACES.

No Drawing. Original application filed June 3, 1924, Serial No. 717,547, and in Great Britain February 14, 1924. Divided and this application filed August 6, 1925. Serial No. 48,660.

This invention relates to material or articles, such as imitation marble, tiles, slabs, and the like, and has more particular reference to the material or articles produced by the process forming the subject of my concurrent application U. S. Patent Serial No. 717,547 filed 3rd June 1924 from which the present application has been divided out.

According to this invention the article or material comprises essentially a facing or layer containing or comprising casein and cement treated or formed to constitute the surface which is to be exposed and a concrete like backing, which together with the facing forms a homogeneous mass.

The facing may be formed or treated to resemble marble, with various colouring and patterns and thus may constitute a comparatively thin but durable layer which is united to the backing during the process of manufacture to produce an integral or homogeneous mass. Single coloured tiles or slabs or tiles or the like in different colours and patterns possessing the characteristics above stated as regards the facing and backing are also provided according to this invention. The article or material may be produced in such manner as to have a highly glazed surface or facing in one or more colours and with various regular or irregular designs or patterns thereon. Broadly stated the article or material is produced by applying a mixture of cement and casein in a fluid state to a moulding surface or the like which may be smooth polished or otherwise according to the kind of surface or facing required on the finished article. The mixture may be applied in layers to a glass or similar surface, the colouring matter being generally introduced into the mixture which is to form the initial layer or layers and finally a backing may be formed by a further application to the basic mixture which is generally uncoloured and contains materials such as are used in the production of concrete.

In the production of articles or material according to this invention, water (say about 44½ gallons) is heated to a temperature of about 120° to 150° F. and to this is added a solvent such as ammonia, (say about 14 fluid ounces) or borax (say about 21 ounces) for dissolving casein and finally the casein (say about 11 pounds) is added the whole being thoroughly stirred. Any suitable solvent for the casein having regard to the purpose in view may be used and the liquid containing the casein in solution may be prepared in large quantities ready for use and when it is required to produce the articles, a quantity of this liquid is taken and to it is added the other materials or substances. For instance cement of a superior grade may be added in such proportion as to enable the resultant mixture to have a consistency that will enable it to be readily and evenly applied to a glass or other moulding surface. Suitable colouring matter such as earth pigments may also be added if and when desired. This mixture may be sprayed, painted or otherwise applied to the moulding surface, and afterwards a further quantity of the mixture containing sand may be applied to or superimposed on the previous layer or layers, this mixture containing if desired suitable colouring matter and serving to impart bulk or a definite thickness, to constitute what may be regarded as the facing to which is then applied in any appropriate manner, a further quantity of the said mixture containing casein and cement, with the addition of sand, ballast, stone chips or similar materials used in making concrete, to form a backing. This backing in some instances might not be required as the layers forming the facing may be made sufficiently thick to enable the product when set to be used for some purposes for example as a kind of surfacing for application to other backings. Generally however the article or products is made with the backing prepared from the mixture of casein and cement and other materials such as referred to above. The surface of the facing may be treated with a hardening and water proofing substance which improves it in many respects as hereinafter referred to and this may be carried out in different ways but usually after the mass has been moved out of contact with the moulding surface. The precise steps in the method or process vary according to the kind of article or material to be produced or to the kind of design or pattern which is to be provided on the article or product. For instance for imitation marble the liquid containing the casein in solution to which cement and a colouring matter have been added to form the initial or facing mixture is painted, sprayed or otherwise applied to the smooth or polished moulding surface. A further quantity of the said mixture containing sand and a different colouring matter may be superimposed at different places on the previous layer whilst still fluid with sufficient force as to displace portions of the initial layer, so that the colour of the second application will show through or between the displaced portions of the initial layer and by this procedure a graining, mottled or similar effect or pattern can be produced to represent imitation marble or the like. Patches, streaks, veins or lines of other colours may be produced for example by painting or spraying quantities of the said facing mixture containing the desired colouring matter prior to the application of the mixture containing the sand. Finally the backing mixture containing cement (which may be coarser than that used in the facing mixture) and sand, ballast, stone chips or the like may be applied to the previous layers before the latter have set. For articles such as single coloured tiles, the initial layer which may contain the desired colour may be applied to the glass moulding surface and upon this layer is superimposed the same mixture containing however sand or the like and the bulk of the colouring matter, the backing mixture then being applied if desired.

For articles such as tiles, panels or the like having a regular design or pattern in colours, initial layers of the facing mixture containing the different colours may be placed in different positions or superimposed on the glass moulding surface and the said mixture containing also sand to complete the formation of the facing may then be applied upon which may be placed the backing mixture. After the various layers have been applied the mass is allowed to set and owing to the same basic mixture of cement and casein being used in the various layers a homogeneous mass is produced which after setting is removed from the moulding surface, the removal being readily effected owing to the presence of the casein in the mixture. No special grinding or polishing operation is necessary and a non-porous facing or surface can be produced on the product which is weather resisting, hard and durable. For hardening the facing or surface of the product it may be treated with a bituminous substance and in this respect a liquid substance known as "ceresitol" may be used, the surface being washed or rubbed with the liquid. This has the effect of hardening the surface and rendering it more weather resisting and durable without detrimentally affecting the glaze or finish. This operation or step may be carried out after setting of the mass and preferably after complete removal from the mould. The water which is used must be clean and suitable for ensuring proper mixing with and setting of the cement.

The mould which is used may be of any suitable construction and may be provided with a glass surface or surfaces according to the parts of the product which are to have the glazed surfaces. In the production of slab-like articles the mould may be in the form of a kind of tray having a glass bottom on which the mixture is applied. The moulding surface may be of curved angular or irregular form according to the required shape of the product and in some cases it need not be smooth or polished. The material according to this invention is especially useful for electrical insulating purposes and can be used as a substitute for marble, slate or the like in switch board construction. Articles to take the place of pottery or ceramic ware can be produced according to this invention by the use of suitable glazed or other moulds. The product although being hard can be readily drilled and worked and if made in slabs or sheets it can be cut or divided into sections of the required size.

What I claim and desire to secure by Letters Patent of the United States is:—

1. An article of manufacture such as imitation marble, a tile, slab or the like comprising a facing or surface containing cement and casein and constituted by an initial film like surfacing layer and a thicker layer, to which latter is united a concrete-like backing.

2. An article of manufacture such as imitation marble, a tile, slab or the like comprising a facing containing cement, casein and colouring matter constituted by a film like surfacing layer and a thicker layer to which is united a concrete-like backing.

3. An article of manufacture such as imitation marble, a tile, slab or the like comprising a film like surfacing layer a main facing layer both containing cement and casein and a backing comprising cement and casein with the addition of filling materials.

4. An article of manufacture such as imitation marble, a tile, slab or the like comprising a facing containing cement and casein with colouring matter and constituted by a film like surfacing layer and a thicker layer to which latter is applied a backing comprising cement, casein, and filling materials.

5. An article of manufacture such as imitation marble, a tile, slab or the like comprising a film like surfacing layer containing cement and casein at the exposed surface, a thicker layer of cement and casein with the addition of sand at the rear surface and a concrete like backing united to said rear surface.

6. An article of manufacture such as imitation marble, a tile, slab or the like comprising a plurality of layers, each containing cement and casein, the initial layer of which is first applied as a film like facing, whilst the final layer is in the form of a concrete-like backing.

7. An article of manufacture such as imitation marble, a tile, slab or the like, comprising a plurality of united layers, each containing cement and casein to form a homogeneous mass, the initial layer forming a film like facing, the second layer containing sand and colouring matter and forming part of the facing layer, and the third layer containing filling materials to produce a comparatively coarse backing.

8. An article of manufacture such as imitation marble, a tile, slab or the like, comprising a plurality of layers each containing cement and casein, said layers being superimposed with a film like initial layer applied to a smooth or glazed surface which imparts a polished surface to the article.

9. An article of manufacture such as imitation marble, a tile, slab or the like, built up in a plurality of layers, each containing cement and casein the first of which is thin and smooth or glazed, the second of which is thicker and contains sand, these two layers forming a facing, whilst the third layer comprises filling material, and constitutes a backing, the various layers being superimposed in a fluid state and forming a homogeneous mass upon setting.

10. Imitation marble, comprising an initial film like layer and a thicker layer to form a facing containing cement and casein and containing colouring matters arranged to produce the grained, veined or mottled appearance or pattern and a concrete like backing on said facing.

11. Imitation marble, comprising a film like facing layer containing casein and cement, a thicker layer containing cement, casein and colourig matter with the addition of sand if desired, and a backing comprising cement, casein and a filling material such as sand, stone chips or ballast.

12. Imitation marble, comprising a smooth and glazed film like facing layer composed of cement and casein and containing colouring matter to form the desired surface pattern, a second and thicker layer also containing colouring matter and a final layer comprising cement, casein and filling material to form a comparatively coarse backing.

13. Imitation marble, tiles, slabs or the like, comprising a thin polished or smooth layer of cement and casein produced by painting a wet mixture of these materials on a glass or smooth moulding surface, to form a film like surfacing, a second and thicker layer containing also sand united to the thin initial film like layer whilst wet, and a backing produced by application to the second layer of a further quantity of cement and casein with the addition of filling material in a wet state, the said wet layers setting and uniting to produce a homogeneous mass with casein throughout the facing of which has the desired surface pattern therein.

14. Imitation marble, tiles, slabs or the like, comprising a coloured facing the exposed part mainly consisting of cement and casein as a film like layer and the rear part containing cement, casein, sand and bulk of colouring matter, a backing constituted by a mixture of cement and casein with the addition of filling material, the whole forming a homogeneous mass due to various layers or applications being superimposed whilst wet with the colouring matters added whilst initial layers are wet, and the whole uniting during the setting and hardening of the said layers without application of any external pressure.

ALBERT BARNES-THOMAS.